(No Model.)

A. BEERS.
DISH CLEANER.

No. 576,021. Patented Jan. 26, 1897.

Witnesses
Edith Himsworth

Inventor
A. Beers
By his Attorney

UNITED STATES PATENT OFFICE.

ALFRED BEERS, OF DENVER, COLORADO.

DISH-CLEANER.

SPECIFICATION forming part of Letters Patent No. 576,021, dated January 26, 1897.

Application filed October 16, 1896. Serial No. 609,046. (No model.)

*To all whom it may concern:*

Be it known that I, ALFRED BEERS, a citizen of the United States of America, residing at Denver, in the county of Arapahoe and State of Colorado, have invented certain new and useful Improvements in Dish-Washers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in dish-washers; and it consists of the features hereinafter described and claimed, all of which will be fully understood by reference to the accompanying drawings, in which is illustrated an embodiment thereof.

Figure 1:
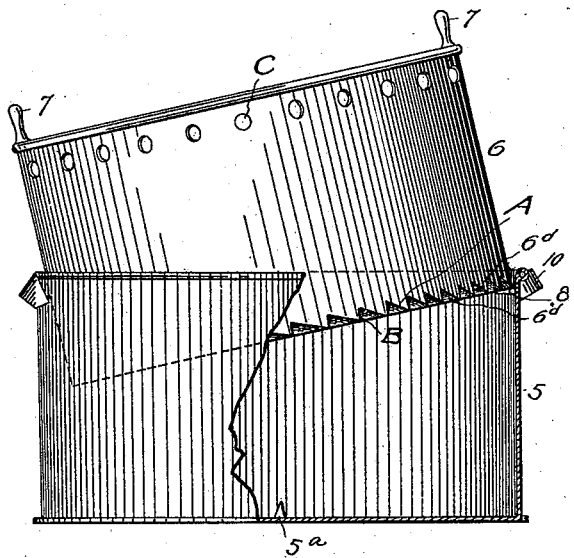
Figure 3:
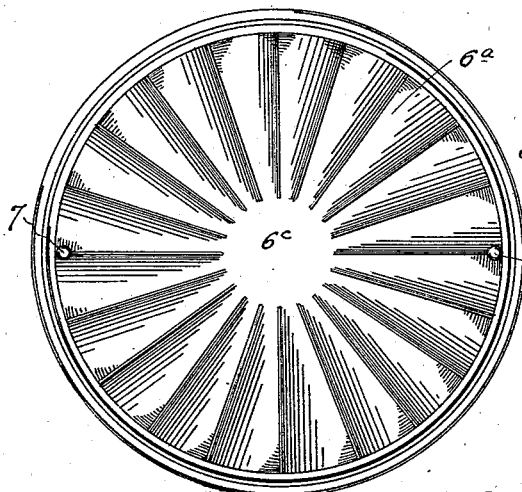
Figure 2:
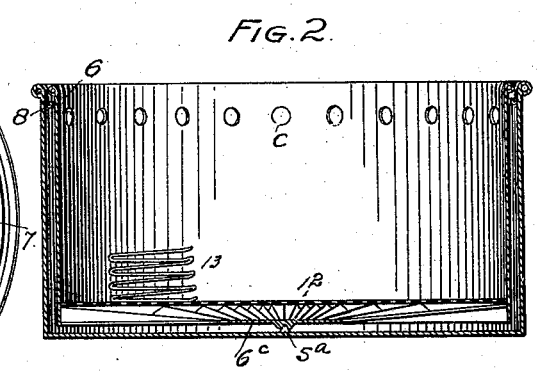
Figure 4:
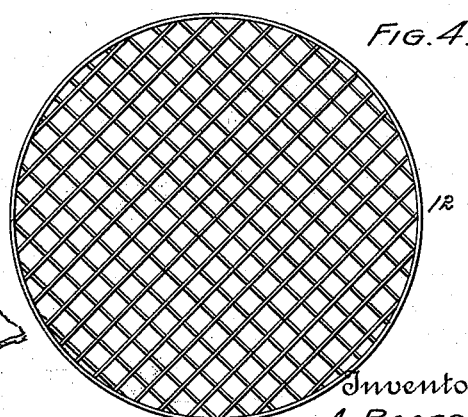
Figure 5:
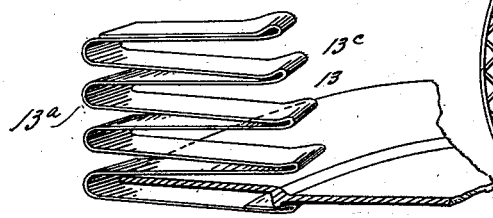

In the drawings, Figure 1 is a side elevation of the device, the inner pan being raised and supported in position to allow the dishes to drain after they are washed. Fig. 2 is a vertical section taken through the complete apparatus, the two pans being shown in position for use. Fig. 3 is a plan view of the device, the screen and the device for separating the plates being removed. Fig. 4 shows the removable screen in detail. Fig. 5 is a perspective view in detail of the device for separating the plates, one of which is shown in place.

Similar reference-characters indicate corresponding parts in the drawings.

Let the numeral 5 designate the outer pan, which may be of any desired size. In the center of the pan is a conical projection $5^a$, forming a pivot which engages a narrow depression or socket formed in the bottom of the pan 6, which fits within the outer pan as closely as is consistent with perfect freedom of rotation of one pan within the other.

The bottom of the inner pan is composed entirely of sector-shaped inclined blades formed by cutting radial slits in a circular piece of sheet metal and bending the blades to the desired inclination. The inner extremities of the blades are left fast to the central portion $6^c$ of the bottom. The outer extremities of the blades are fastened by soldering or otherwise, suitably fastening them to the outer wall of the pan, which is provided with notches $6^d$. The lines A, bounding these notches on one side, (see Fig. 1,) indicate the inclination of the blades, while the lines B, bounding the notches on the other side, indicate the depth of the spaces between the blades.

The wall of the inner pan is provided with openings C, located near the top thereof. The inner pan is also provided with two handles 7, attached thereto and projecting above its upper edge. The handles are located at diametrically opposite points. The outer pan is provided with a wire 8, attached to the inner surface of its wall near its upper edge and extending entirely around the same. This wire acts as a guide to the inner pan and also prevents any tendency on the part of the water to pass upward over the edge of the outer pan. The wire also forms a circular groove on the inner surface of the pan, the solder for securing the wire being applied to the upper surface thereof only. This groove is well adapted to stay the progress of the water as it moves upward. The openings C of the inner pan are so located as to allow the water, whose upward progress is checked by the wire, to pass thence into the inner pan. This wire also forms a support for the inner pan when raised and tilted, as shown in Fig. 1.

When washing small articles, like cups, knives, forks, spoons, &c., which might project through the openings between the blades $6^a$ and interfere to some extent with the working of the device, I employ a flat coarse screen 12, placed in the bottom of the inner pan and lying on the blades $6^a$. When washing larger articles, this screen is not needed and may be removed, since it is detachable at will.

When washing plates, I use a separating device 13, adapted to hold the plates apart when placed one above the other, to allow the water to circulate freely between them. This device is preferably formed from a narrow integral strip of sheet metal bent to form a series of horizontal or approximately horizontal separating-folds $13^a$, whose inner extremities $13^c$ project underneath the plates beyond the circular rims formed on their lower surfaces. The extremities $13^c$ are bent upward slightly to engage the said rims of the plates and whereby the latter are held in the proper position during the washing operation. The folding parts of this device are pressed quite closely together at their inner extremities, while their opposite extremities are rounded and more separated, thus giving a certain degree of elasticity or spring to the folds, whereby the device is so constructed as to adapt itself to fit the plates when they are piled together one upon another. This peculiar construction of the device permits of some lateral movement on the part of the folds, which facilitates the work of cleansing the dishes without danger of breakage, as might be the case if the device were perfectly rigid. This device occupies a position adjacent the vertical wall of the inner pan, (see Fig. 2,) the plates being placed between the folds, in which position they are maintained during the operation of washing, since they cannot move far enough in any direction to slip out of place. This device allows the plates to move one upon the other, which movement assists in the washing process. Without a device of this character it is difficult to wash heavy plates, since they lie so close together that the water cannot well reach their engaging surfaces. This device I have found very effective, indeed all that could be desired in overcoming the difficulty mentioned.

In using the device the proper quantity of water is first placed in the outer pan. The dishes to be washed are placed in the inner pan, which is then set into the outer pan. The user then grasps the handles 7 and gives the inner pan a series of partial rotary movements in reverse directions. As the pan is turned in one direction the water is sucked or drawn downward and forced outward between the two pans, while as the pan is moved in the opposite direction the water is given a counter or opposite direction. Hence the water is rapidly forced between the dishes in opposite directions, whereby they are quickly and thoroughly cleansed.

It is evident that the sector-shaped inclined blades of the inner pan are an important feature in carrying out the function of the device. These blades produce the agitation of the water or its alternate movement in opposite directions between the dishes, but as they are located at the bottom of the device and with a considerable body of water above them the tendency of the water to slop over, as a result of the agitation, is entirely overcome. Hence the device needs no cover. After the dishes have been washed the inner pan is raised and tilted to the position shown in Fig. 1 of the drawings. This allows the dishes to drain and gives an opportunity for rinsing or scalding them, if desired, previous to wiping. It will thus be observed that in using this construction it is under no circumstances necessary for the user to put his hands in the water. Hence boiling-hot water may be used, as well as any washing compound or composition. I have found the compound known as "Gold Dust" very effective for using with this device. These washing compounds, while very useful in washing dishes, are not generally used for the reason that they are very injurious to the hands. This difficulty, however, is entirely eliminated by using my device.

When the inner pan is raised and tilted to the position shown in Fig. 1, it is locked in said position by its engagement with the wire 8 of the outer pan. If it were not for this wire, the inner pan would have to be tilted to such an inclination to be supported on the outer pan that its lower portion would dip into the water. Moreover, it is not desirable to tilt the inner pan any more than is absolutely necessary, since if it is quite full of dishes they would be liable to slip out. Hence the wire 8 performs an important function in supporting the inner pan in the tilted position.

I further desire to call attention to the fact that the same operation which washes the dishes also cleanses the washer itself. After the dishes are washed and wiped it is only necessary to drop the inner pan to the operative position within the outer pan and give it a few partial rotations in opposite directions, when both pans will be cleansed. The inner pan is then lifted out and wiped, after which the water is poured from the other pan and the latter wiped. Both pans are thus left perfectly clean. The special use of the screen 12 and the plate-separating device 13 has already been explained.

Having thus described my invention, what I claim is—

1. In a dish-washer, the combination with the outer pan, of an inner pan rotatably supported in the outer pan and having an integral bottom consisting of sector-shaped inclined blades, formed by cutting radial slits in a circular piece of sheet metal and bending the blades to a suitable inclination, their inner extremities being left fast to the central portion of the bottom, and their outer extremities being secured to the vertical wall of the pan, substantially as described.

2. In a dish-washer, the combination with the outer pan having a central pivot in its bottom and a wire attached to its inner wall near the top thereof, and the inner pan having an integral bottom, comprising a central portion 6°, the bottom of the pan around this central portion being formed into sector-shaped blades, whose inner extremities are fast to said central portion, said blades being bent to a suitable inclination, their outer extremities being secured to the vertical wall of the pan, the central portion of the inner pan's bottom having a socket which the pivot of the outer pan engages, substantially as described.

3. In a dish-washer, the combination with an outer pan, of an inner pan rotatably mounted and having an integral bottom composed of a central portion and radial inclined blades, whose outer extremities are secured to the vertical wall of the pan, and a device adapted to hold the plates apart while washing, substantially as described.

4. In a dish-washer, the combination with an outer pan, of an inner pan rotatably mounted and having an integral bottom, comprising a central portion and radial inclined blades whose outer extremities are secured to the vertical wall of the pan, and a detachable screen engaging the bottom of the inner pan, as and for the purpose set forth.

In testimony whereof I affix my signature in presence of two witnesses.

ALFRED BEERS.

Witnesses:
 ALFRED J. O'BRIEN,
 G. J. ROLLANDET.